US008775216B1

(12) United States Patent  
Amick et al.

(10) Patent No.: US 8,775,216 B1  
(45) Date of Patent: Jul. 8, 2014

(54) SYSTEM AND METHOD FOR CATEGORIZING OCCUPATIONAL DISABILITIES

(75) Inventors: Carl G. Amick, Lanesboro, MA (US); John M. Grogan, Fox Point, WI (US)

(73) Assignee: The Northwestern Mutual Life Insurance Company, Milwaukee, WI (US)

( * ) Notice: Subject to any disclaimer, the term of this patent is extended or adjusted under 35 U.S.C. 154(b) by 260 days.

(21) Appl. No.: 12/888,203

(22) Filed: Sep. 22, 2010

Related U.S. Application Data

(60) Provisional application No. 61/246,415, filed on Sep. 28, 2009.

(51) Int. Cl.
*G06Q 40/00* (2012.01)
*G06Q 40/08* (2012.01)

(52) U.S. Cl.
CPC ..................... *G06Q 40/08* (2013.01)
USPC .......................................................... 705/4

(58) Field of Classification Search
CPC ..................................................... G06Q 40/08
USPC .......................................................... 705/4
See application file for complete search history.

(56) References Cited

U.S. PATENT DOCUMENTS

2011/0077980 A1* 3/2011 Kay .................................. 705/4

OTHER PUBLICATIONS

Darras, Frank N. "Adjusting the Definition", Best's Review, vol. 105, No. 7, Nov. 9, 2004, 2 pages.
Devries, Douglas K. "Own Occupation Disability Insurance Claims", http://www.dkdlaw.com/articles/own_occupation.html, Jul. 14, 2009, 10 pages.
Fries, Arthur K. "Dual Occupations", Health Insurance Underwriter (N.A.H.U.), Apr. 2005, 2 pages.
Rosen, Martin. "Erreca, Moore, Austero, and now . . . Hecht", Life, Health and Disability Insurance Law Blog: California Disability Lawyer & Attorney: Barger & Wolen Law Firm: CA Life Insurance & ERISA Law, posted Mar. 10, 2009, 2 pages.
"Description and Actuarial Memorandum", The Northwestern Mutual Life Insurance Company, Mar. 2009, 8 pages.
"Disability Income Policy", The Northwestern Mutual Life Insurance Company, believed to have been available prior to Sep. 28, 2009, 15 pages.
"Request for Disability Benefits", The Northwestern Mutual Life Insurance Company, believed to have been available prior to Sep. 28, 2009, 7 pages.
"Request for Continuance of Disability Benefits", The Northwestern Mutual Life Insurance Company, believed to have been available prior to Sep. 28, 2009, 3 pages.

* cited by examiner

*Primary Examiner* — Thomas M Hammond, III
(74) *Attorney, Agent, or Firm* — Foley & Lardner LLP

(57) ABSTRACT

An insurance claim of an insured under a disability income insurance policy is processed. The policy contemplates that the insured has an occupation in which the insured performs a first set of duties and potentially other duties. In processing the insurance claim, the system and method focus on whether the insured is unable to perform the first set of duties. A threshold test may also be applied to ensure that the amount of the activities spent engaging in the first set of duties during a time period preceding a disability exceeds a threshold.

34 Claims, 6 Drawing Sheets

SYSTEM AND METHOD FOR CATEGORIZING OCCUPATIONAL DISABILITIES

CROSS REFERENCE TO RELATED APPLICATIONS

This application claims the benefit of U.S. Prov. Ser. No. 61/246,415, filed Sep. 28, 2009, entitled "System and Method for Categorizing Occupational Disabilities," hereby incorporated by reference in its entirety.

BACKGROUND

Disability income insurance policies are sometimes purchased to insure against loss of earning capacity. Such policies may be purchased individually or as part of a group plan. In some cases, the insurance policies insure against loss of earning capacity specific to an insured's regular own occupation. Such insurance policies are often referred to as "own occupation" or "own occ" polices. Under such a policy, whether an insured is considered totally disabled is determined based on the insured's ability to perform the duties of the occupation performed by the insured during the time period preceding the disability. For example, for a surgeon, whether the surgeon is considered totally disabled may be determined based on the surgeon's ability to perform the surgical procedures and other duties that were performed prior to the disability.

SUMMARY

According to an example embodiment, an insurance claim of an insured under a disability income insurance policy is processed in which the policy is configured for an insured having an occupation in which the insured performs a first set of duties and potentially other duties. During processing, a determination is made of the extent to which the insured has been engaged in the first set of duties. The determination is made based on information regarding the activities of the insured during a time period preceding a disability of the insured. The information may relate to the activities of the insured in connection with the occupation of the insured during the time period preceding the disability. Various metrics may be used to track the activities of the insured, such as charges generated, time spent on various tasks, and so on. The determination may be made by applying a threshold test to determine whether an amount of the activities of the insured spent engaging in the first set of duties exceeds a predetermined threshold. The method further comprises determining whether the insured is unable to perform the first set of duties based on information regarding the condition of the insured. The benefit payment amount is then determined based on results of the threshold test, whether the insured is unable to perform the first set of duties, and other factors.

DETAILED DESCRIPTION OF EXAMPLE EMBODIMENTS

Figure 1:
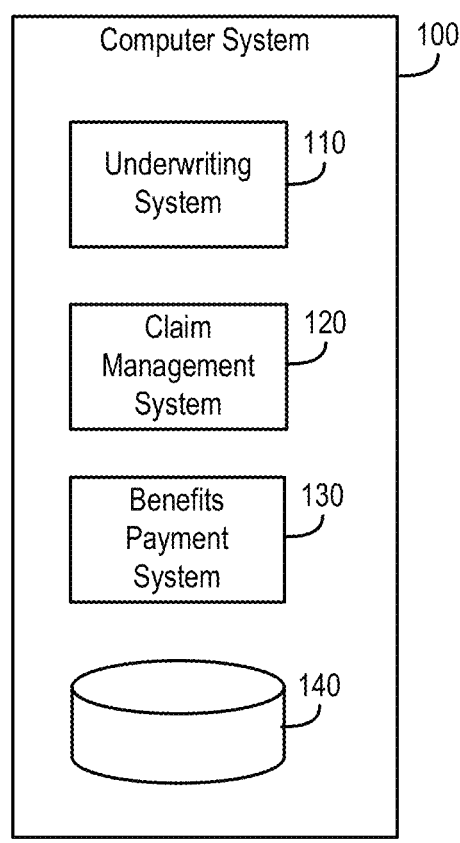
FIG. 1 is a diagram showing a computer system that underwrites and manages disability polices according to an example embodiment.

Referring now to FIG. 1, a computer system 100 used to underwrite and manage disability policies is shown. As described in greater detail below, the computer system 100 is configured to perform processing in which a primary set of duties is considered and a threshold test is applied to determine the extent to which the insured was engaged in the primary set of duties during the time period preceding a disability. For example, if the insured is an actor, the insured may have had two duties consisting of acting and making product endorsements. However, in an example embodiment, only one of these duties (i.e., acting) is considered a primary duty. The other duty of the insured (i.e., making product endorsements), is not considered to be among the primary set of duties (without regard, potentially, to which duty is more significant in terms of income generated). The threshold test may then be applied to ensure that the amount of activities of the insured engaging in the primary set of duties exceeds a predetermined threshold (e.g., to ensure that the actor was engaged in at least a certain amount of acting during the time period preceding the disability). The threshold test may be single-tiered or multi-tiered (e.g., first ensuring that a certain amount of the activities of the actor was spent in the entertainment industry, and then ensuring that a certain amount of such activities in the entertainment industry were spent acting). The activities of the insured may be measured in terms of time spent performing the activities, income produced performing the activities (e.g., as measured by charges billed, revenues collected, etc.), or in another manner. Assuming the threshold test(s) is met, and assuming the insured is no longer able to perform the primary duties, then the insured is considered totally disabled. Hence, the insured may be considered totally disabled even though the insured is able to perform other duties that generated substantial portions of income for the insured (e.g., potentially even greater than that associated with the primary duty) prior to the disability.

The arrangement described may be used in the context of insureds having various types of occupations, such as attorneys, professional athletes, medical professionals (e.g., doctors, surgeons, dentists), and so on. For example, for a trial attorney, the duties performed prior to the disability may consist of making courtroom appearances, consulting with clients, drafting pleadings, and attending to law firm management responsibilities. The primary duties may be considered making courtroom appearances and consulting with clients, with the other duties not being considered among the primary duties. For a professional athlete, the duties performed prior to the disability may consist of competing in professional sporting events and making product endorsements through activities such as making commercials. The primary duty may be competing in professional sporting events. For a surgeon, the duties performed prior to the disability may include performing surgical procedures, conducting office visits with patients, and consulting. The primary duty of the surgeon may be conducting surgical procedures. As will be appreciated, the primary duties (or a range of activities that may constitute primary duties if performed by the insured during the time period preceding the disability), the relative importance of the primary duties, the threshold tests applied, and so on, may vary in different embodiments of the invention. Further, it should be understood that while certain examples (and other discussion) are given herein, these examples are purely hypothetical in nature and are given only for purposes of example in this patent application. That is, the examples and other discussion are irrelevant to the interpretation of any terms used in an actual insurance policy and are irrelevant to the application of such terms to a particular fact situation relating to an insured.

The duties or the test for the duties that constitute the primary duties may be specified in the disability policy sold to the insured. As another example, the disability policy may contain terms that define a range of activities that may constitute a primary duty if performed by the insured during the time period preceding the disability, such that the primary duty(s) of the insured may be determined at the time of the disability. At the time of disability, the insured may also regularly perform other duties as part of the insured's occupation. However, if these duties are not eligible to be considered a primary duty within the terms of the disability policy, then they are not considered to be a primary duty. As will also be appreciated, not every task the insured performs may constitute a duty in accordance with the disability policy. For example, some tasks may be too inconsequential in nature to constitute a duty. Likewise, the threshold test(s) to be applied may be specified in advance of the issuance of the disability policy. The arrangement described herein may be provided as an addendum to a standard disability policy, as part of a stand-alone policy, or in another manner. The arrangement described herein may be included in the disability policy at the time of its initial issuance, or later, as a rider to the original policy. Additionally, the arrangement described herein may be provided in the context of a policy that uses a modified own occupation definition of total disability, a pure own occupation definition of total disability, a specialty own occupation definition of total disability, or another definition of total disability. In the example herein, the base definition of total disability is expanded such that the insured may potentially receive a higher benefit payment (e.g., the full total disability benefit) even in situations where the insured is still able to perform one or more duties that were regularly performed prior to the disability. As will be appreciated, this result may also be achieved by the manner in which partial disability is defined or in another manner. The policies, and any attached rider, may be sold as individual policies, group policies, or in another manner.

The computer system 100 may be configured to reflect (through appropriate programmed business logic) the terms of the disability policy to facilitate claims processing and management of the disability policy by the computer system 100. Computer system 100 may be an enterprise computing system (e.g., one or more networked computer servers) of an entity that offers disability policies for sale to clients/customers. The computer system 100 comprises underwriting system 110, a claims management system 120, a payment system 130, and a data storage system 140. (While the arrangement described herein is described in the context of an example in which the underwriting, pricing, issuance, and processing of disability policies is automated to a large extent, it will be appreciated that a greater or lesser degree of automation may also be used.) The underwriting system 110 is configured to assist underwriting, pricing, and issuance of disability policies, as discussed in greater detail below in connection with FIGS. 5-7. The claims management system 120 is configured to assist users perform tasks related to processing and managing insurance claims. The claims management system 120 may be used to automate workflows associated with processing disability claims. The claims management system 120 may also cooperate with payment system 130 to automate monthly disability payments once a disability claim has been favorably resolved on behalf of the insured. For example, the claims management system 120 may send a payment signal to the payment system 130 to cause a check to be printed and mailed to the payee (e.g., insured or other policyowner), to cause funds transfer instructions to be sent to an Automated Clearing House (ACH) system or other electronic payment network to transfer funds to an account of the payee (e.g., insured or other policyowner), or to implement payment in another manner. (The policyowner is often the same person as the insured, however, this is not always the case.) The claims management system 120 may also provide an interface to the data storage system 140 and permit users to collect and store information (e.g., forms data, alphanumeric data regarding issued policies and disability claims, and so on) in the data storage system 140. The claims management system 120 may also permit users to display and view any of the information in the data storage system 140, to use the information to generate statements and reports, and so on.

The data storage system 140 may be accessed by the underwriting system 110, the claims management system 120, and the payment system 130 and may comprise one or more databases. For example, the data storage system 140 may comprise a series of databases each of which is respectively associated with one of the systems 110-130. A centralized database may also be used. The data storage system 140 stores information collected throughout the lifecycles of disability policies. For example, once the disability policies are initially issued, information regarding the policies may be stored in data storage system 140 (e.g., names of the insureds and other information collected during underwriting). When a claim has been made, data regarding the condition of insureds (e.g., the nature of their disability and so on) may be entered into the claims management system 120 by a claims processor, and the claims management system 120 may store the information in the data storage system 140. For example, this information may include medical or financial records of the insured and entered into the data storage system 140 using the claims management system 120. (The term "claims processor" as used herein refers to a human claims processor. In all other instances, the term "processor" refers to a device that executes machine-executable instructions stored in machine-readable storage media.) Alternatively, such information may be received electronically from a health information system.

The data storage system 140 may also store information regarding activities of the insured in connection with engaging in their occupation during a time period preceding the disability. The activities may include physical and/or mental activities. As a practical matter, many activities may be both physical and mental activities (e.g., an actor delivering lines is both recalling the lines to be delivered and engaging in the physical act of delivering the lines). As described below, the activities of a medical professional may be measured in terms of income produced performing the activities (e.g., CPT or ADA billing codes as recorded in invoices sent to insurance companies). The income produced may be measured in terms of billings, collections, or other metrics. For other specialists, the activities may be measured in other ways. For example, the activities of an attorney may be measured in terms of time spent performing the activities (e.g., billable hours as recorded in invoices sent to clients). Task codes, practice group codes, and other codes that are electronically stored as part of the time entry and billing process are often used to track the profitability of specialty practices and may be used in the present context to assess the amount of time the attorney spent engaging in the specialty practice. Again, the income produced may be measured in terms of billings, collections, or other metrics (e.g., where the attorney bills on a contingent fee basis). As part of the claims process, the insured may be asked to provide paper or electronic records substantiating such activities during the time period preceding the disability. Such information may then be stored in the data storage system 140.

Figure 2:
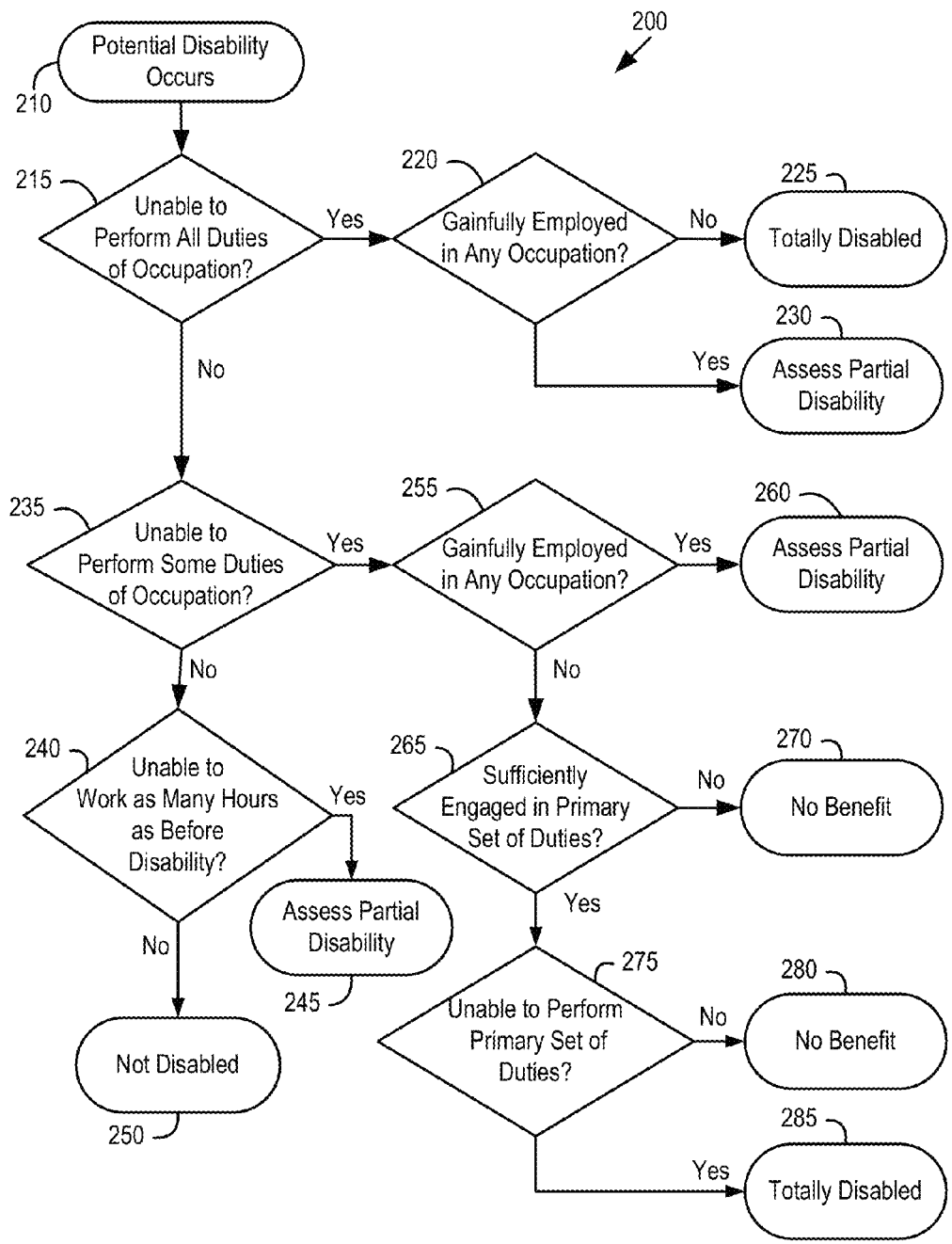
FIG. 2 is a flow chart showing operation of the computer system of FIG. 1 in connection with claim processing according to an example embodiment.
Figure 3:
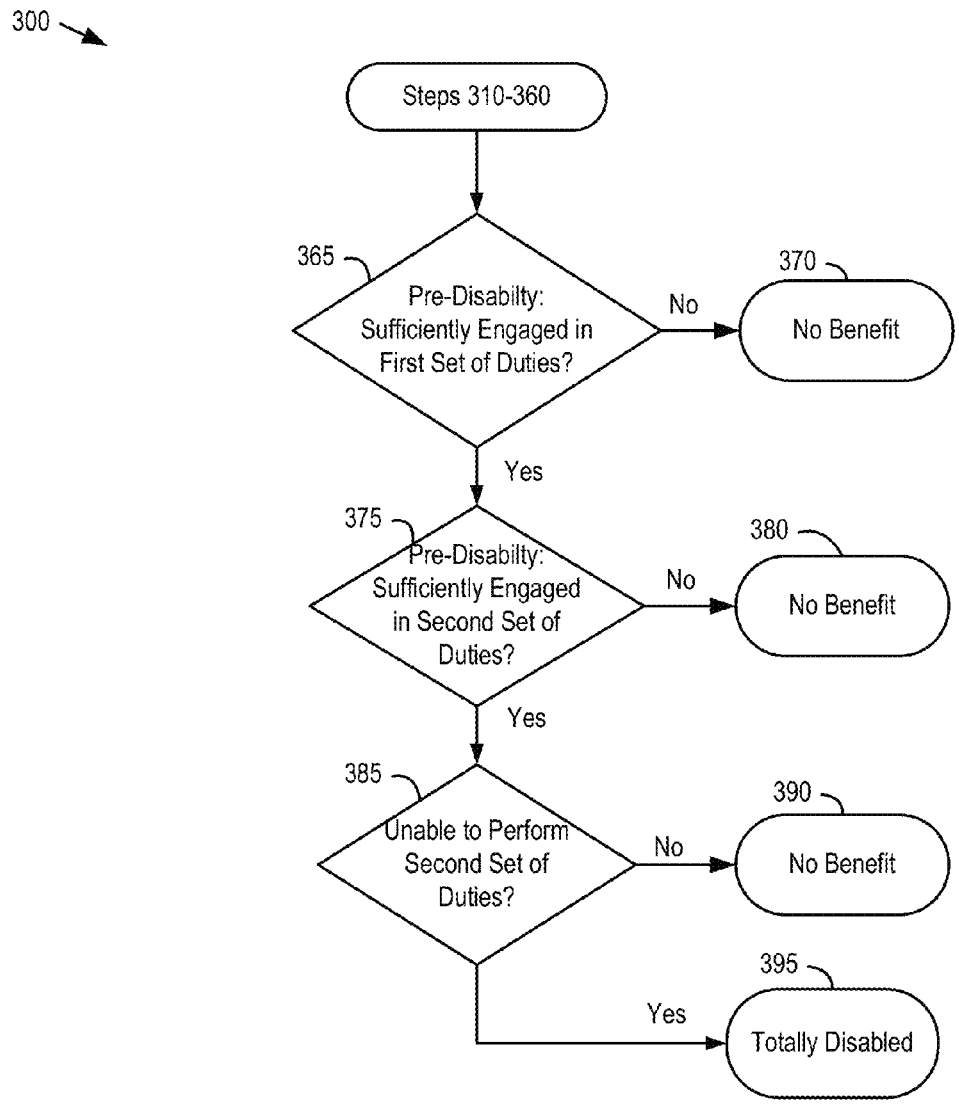
FIG. 3 is a flow chart showing operation of the computer system of FIG. 1 in connection with claim processing according to another example embodiment.

Referring now to FIGS. 2-3, examples of operation of the computer system 100 to process a claim of an insured under a disability policy are shown. FIG. 2 provides an example in which one threshold test is applied. FIG. 3 provides another example in which multiple threshold tests are applied.

Referring first to FIG. 2, process 200 is initiated upon onset of a potential disability (step 210). The filing of a claim form responsive to the potential disability of the insured gives rise to the insurance claim. For example, the insured may complete and submit a request for disability benefits form in order to make a claim for benefits under the disability policy. The form may be completed and sent to the insurer in paper or electronic format. Data collected from the form may then be stored in the data storage system 140 using the claims management system 120.

At step 215, it is determined whether the insured is unable to perform the duties of their occupation. For example, as part of the claims process, the claim form may prompt the insured to specify the duties of the insured's occupation and the amount of time (or other measurement of activity) spent performing each duty. For example, a trial attorney may specify "making courtroom appearances (25%), consulting with clients (15%), pleadings and strategy development (40%), law firm management (10%), and teaching (adjunct professor) (10%)." Again, the insured may be asked to substantiate this information with billing records (e.g., billing codes, billable hours, etc., from computer systems or other records of the insured's business or employer). An analysis of the activities of the insured during the time period preceding the disability may be undertaken in order to obtain an assessment of the duties of the insured. The analysis may be performed using computerized tools provided by the claims management system 120 that facilitate analyzing (e.g., sorting and tabulating) the billing data to determine the amount of time spent by the insured on each of the duties of their occupation.

Once the duties of the insured are determined, a further determination is made as to whether the insured is unable to perform the duties of their occupation (e.g., in the example above, making courtroom appearances, consulting with clients, pleadings and strategy development, law firm management, and teaching). For example, information concerning the condition of the insured may be obtained from medical professionals who have evaluated the insured. Such information may be received from the medical professional (e.g., in paper format or in electronic format from a health information system) and stored in the data storage system 140 using the claims management system 120. Based on this information, information may be stored as to whether the insured is unable to perform the duties of their occupation. During step 215, the stored information regarding the condition of the insured (and what duties the insured is able to perform) may be compared with the stored information regarding the duties of their occupation to determine whether the insured can perform the duties of their occupation.

If the insured is unable to perform all of the duties of their occupation at step 215, then the process proceeds to step 220. At step 220, it is determined whether the insured is gainfully employed in any occupation. This determination may be made based on the information received from the insured and potentially verified by a claims processor. In the illustrated embodiment, if the insured is not gainfully employed in any occupation, then the insured is considered as being totally disabled under the policy and its definition of total disability (step 225). Conversely, if the insured continues to be gainfully employed following the onset of a claimed disability, then the insured is not considered as being totally disabled under the policy and its definition of total disability. After making that determination, an assessment is then made whether the insured is partially disabled instead (step 230). In one example of determining the amount of benefit payment for a partial disability, a threshold test may be applied based on the percentage of the pre-disability income replaced by the income from the gainful employment. If the percentage equals or is above an upper limit, then no calculated benefits are payable. If the percentage equals or is below a lower limit, then income from the gainful employment will not disqualify the insured from receiving the full disability benefit. If the percentage is between the upper limit and the lower limit, then income from the gainful employment will proportionally reduce the full disability benefit.

If the insured is not unable to perform all of the duties of their occupation at step 215 (i.e., if the insured is able to perform some or all of the duties of their occupation), then the process proceeds to step 235. At step 235, it is determined whether the insured is unable to perform some (e.g., one or more) of the duties of their occupation. If a "no" determination is made at step 235 (i.e., the insured is able to perform all of the duties of their occupation), then a further determination is made whether the insured is unable to work as many hours as before the disability at step 240. If a "yes" determination is made at step 240 (i.e., the insured is able to perform all of the duties of their occupation, but is unable to work as many hours as before the disability), then partial disability is assessed at step 245. Step 245 may be performed in the manner described above with regard to step 230. If a "no" determination is made at step 240 (i.e., the insured is able to perform all of the duties of their occupation and is able to work as many hours as before the disability), then the insured is considered as being neither partially nor totally disabled under the policy and its definitions of partial and total disability (step 250).

Returning to step 235, if a "yes" determination is made at step 235 (i.e., the insured is able to perform some but not all of the duties of their occupation), then the process proceeds to step 255. At step 255, it is determined whether the insured is gainfully employed in any occupation. Step 255 may be performed in the manner described above with regard to step 220. If the insured continues to be gainfully employed following the onset of a claimed disability, then the insured is not considered as being totally disabled under the policy and its definition of total disability. After making that determination, an assessment is then made whether the insured is partially disabled instead (step 260). Step 260 may be performed in the manner described above with regard to step 230.

If the insured is not gainfully employed in any occupation at step 255, then the process proceeds to step 265. At step 265, a threshold test is performed to ensure that the insured has been sufficiently engaged in a primary set of duties during a predetermined time period preceding the disability. For example, the policy may be configured such that the threshold test focuses only on the duty of making courtroom appearances, i.e., such that the primary set of duties consists of one duty, namely, making courtroom appearances. The threshold test is then performed to ensure that the attorney spent at least a certain amount of time making courtroom appearances during the time period preceding the disability. Again, the determination may be made based on the information regarding the activities of the insured (e.g., billing codes, billing records, and so on), and the analysis may be performed using computerized tools provided by the claims management system 120 that facilitate analyzing such data. As described in greater detail below, multi-tiered threshold tests may also be used. If the insured's activities do not meet the specified threshold, then the insured is not considered as being totally disabled under the definition, and no benefit is available (step 270). If, however, the insured's activities meet the specified threshold, then the process proceeds to step 275.

At step 275, it is determined whether the insured is unable to perform the primary duties based on the information regarding the condition of the insured. Again, this determination may be made based on information received from a medical professional and entered by the claims processor in the data storage system 140. If the insured is not unable to perform the primary duties, then no benefit is available (step 280). If the insured is unable to perform the primary duties, then the insured is considered totally disabled (step 285). The determination whether the insured is totally disabled may be stored in the data storage system 140.

The insured is thus categorized as either totally disabled or not totally disabled based on results of the threshold test and based on whether the insured is unable to perform a primary set of duties. The insured may be categorized as totally disabled even though the insured is able to perform some of the other duties that were regularly performed by the insured during the time period preceding the disability. For example, in the example above, if the trial attorney is no longer able to make court room appearances, the trial attorney may be considered totally disabled even though the trial attorney is able to perform other duties such as consulting with clients, pleadings and strategy development, law firm management, and teaching.

In the example above, the policy is configured such that the insured's courtroom appearances constitute the only primary duty, and the determination of whether the insured is unable to perform the primary set of duties focuses solely on the ability of the insured to make courtroom appearances. As another example, the policy may be configured such that the primary set of duties of the insured consists of multiple duties. For example, the policy may be configured such that the insured's courtroom appearances and consulting with clients constitute the primary duties. In such an arrangement, as will be appreciated, different approaches may be taken for determining whether the insured is unable to perform the primary set of duties. As one example, the policy may be configured such that determining whether the insured is unable to perform the primary set of duties involves determining whether the insured is unable to perform either of the two primary duties (i.e., the insured can be considered totally disabled if the insured is unable to perform either of the two primary duties). As another example, the policy may be configured such that determining whether the insured is unable to perform the primary set of duties involves determining whether the insured is unable to perform both of the two primary duties (i.e., the insured can be considered totally disabled only if the insured is unable to perform both of the two primary duties). As will be appreciated, further variations (e.g., hybrid combinations) are also possible.

The policyowner or other payee may receive different levels of benefits depending on whether the insured is categorized as not disabled, as partially disabled, or as totally disabled. For example, if the insured is categorized as totally disabled, the payee may receive a full disability benefit. On the other hand, if the insured is categorized as partially disabled, the payee may receive the full disability benefit or a lesser benefit.

Referring now to FIG. 3, FIG. 3 provides another example in which multiple threshold tests are applied. FIG. 3 can be considered as being the same as FIG. 2, except that an additional threshold test is applied. The details of steps 310-360 are not shown in FIG. 3, however, steps 310-360 may, for example, be the same as steps 210-260 in FIG. 2. The "primary set of duties" in FIG. 2 correspond to the "second set of duties" in FIG. 3.

In the example of FIG. 3, the insured is assumed to be a medical practitioner (e.g., a surgeon or other occupation involving patient care). For purposes of the example of FIG. 3, it is assumed that the duties of the medical practitioner during the time period preceding the disability were performing surgeries, conducting office visits, and consulting. In the example of FIG. 3, it is further assumed that the disability policy categorizes the duties into various sets of duties, e.g., a first set of duties that involve providing direct patient care (e.g., in this example, performing surgeries and conducting office visits), and a second set of duties that relate to the primary medical service offered by the medical practitioner (e.g., in this example, performing surgeries). The second set of duties is thus a subset of a first set of duties. The surgeon may also have other duties which are not among the first set of duties or the second set of duties (e.g., in this example, consulting). Again, as noted elsewhere, the examples herein are purely hypothetical in nature and are given only for purposes of example in this patent application. The examples and other discussion are irrelevant to the interpretation of any terms used in an actual insurance policy and are irrelevant to the application of such terms to a particular fact situation relating to an insured.

Steps 310-360 proceed as described above in connection with steps 210-260. For example, at step 315, if prior to the disability, the insured's duties included performing surgical procedures (40%), conducting office visits (30%), and consulting (30%), then a determination is made whether the insured is able to perform the surgical procedures, conduct office visits, and engage in consulting. Assuming the insured is able to perform one or more but not all of the duties of their occupation, and assuming that the insured is not gainfully employed in any occupation, then the process proceeds to step 365.

At step 365, a first threshold test is applied to determine whether, at the time the disability began, at least a predetermined amount of the insured's time was spent providing direct patient care (i.e., care and/or other services). For example, the threshold test may examine whether more than 50% of the insured's time was spent providing direct patient care, e.g., during a predetermined time period preceding the disability. For example, the threshold test may look at a six month, twelve month, eighteen month, or some other time period preceding the disability. Again, the determination may be made based on the information regarding the activities of the insured (e.g., billing codes), and the analysis may be performed using computerized tools provided by the claims management system 120 that facilitates analyzing such data. ("Billing code" as used herein in the context of FIG. 3 means a code generally accepted by the healthcare and insurance industries, such as Current Procedural Terminology (CPT) or American Dental Association (ADA), that is used to identify and describe medical, surgical, diagnostic, or dental services performed.) Other thresholds may be used. For example, the threshold may be a value within the range of 20% to 80% (e.g., a value within the range of 20% to 40%, a value within the range of 40% to 60%, a value within the range of 60% to 80%, or a value within the range of 30% to 70%). If the insured's activities do not meet the specified threshold, then the insured is not considered as being totally disabled under the definition, and no benefit is available (step 370). If, however, the insured's activities meet the specified threshold, then the process proceeds to step 375.

At step 375, a second threshold test is applied to determine whether an amount of the activities of the insured spent engaging in the second set of duties exceeds a predetermined threshold. Again, the determination may be made based on the information regarding the activities of the insured (e.g., billing codes), and the analysis may be performed using computerized tools provided by the claims management system 120 that facilitates analyzing such data. Thus, for example, the portion of charges of the insured attributable to the second set of duties may be calculated. Additionally, the total amount of charges of the insured for the first set of duties (which includes the charges attributable to the second set of duties) may be calculated. The ratio of the portion of charges attributable to the second set of duties to the total amount of charges for the first set of duties may then be calculated and compared with the predetermined threshold (e.g., 50% or a value within the range of 20% to 80%, 30% to 70%, 40% to 60%, or 45% to 55%). Thus, for example, the ratio of the portion of charges attributable to performing surgeries to the total amount of charges for both performing surgeries and conducting office visits may be calculated and compared with the 50% threshold. If the insured's activities for performing surgeries do not meet the specified threshold, then the insured is not considered as being totally disabled under the definition, and no benefit is available (step 380). If, however, the insured's activities meet the specified threshold, then the process proceeds to step 385.

At step 385, it is determined whether the insured is unable to perform the second set of duties (e.g., surgeries) based on the information regarding the condition of the insured. For example, the stored information regarding the condition of the insured (and what duties the insured is able to perform) may be compared with the stored information regarding the second set of duties to determine whether the insured can perform the second set of duties. Again, as in step 275, if the insured is not unable to perform the second set of duties, then no benefit is available (step 390). If the insured is unable to perform the second set of duties, then the insured is considered totally disabled (step 395). The determination whether the insured is totally disabled may be stored in the data storage system 140.

It may be noted that the insured may be considered totally disabled even though the insured is able to perform some of the duties that were performed prior to the disability. As a hypothetical example, assume that, prior to the disability, the insured's duties included performing surgical procedures (30%), conducting office visits (25%), and consulting (45%). (For sake of simplicity, further assume that the insured charges equally on an hourly basis for each of these activities.) As a result of the disability, the insured is no longer able to perform surgical procedures. Under this example, the insured satisfies the first threshold because 55% of the insured's time was spent providing direct patient care. The insured also satisfies the second threshold because more than 50% of the insured's patient care charges came from surgical procedures (i.e., more charges came from performing procedures than from performing office visits; 30%÷(30%+25%)= 54.5%). Thus, the insured is considered to be totally disabled even though the insured is still able to perform other duties besides performing surgeries, such as conducting office visits and performing outside consulting.

Figure 4:
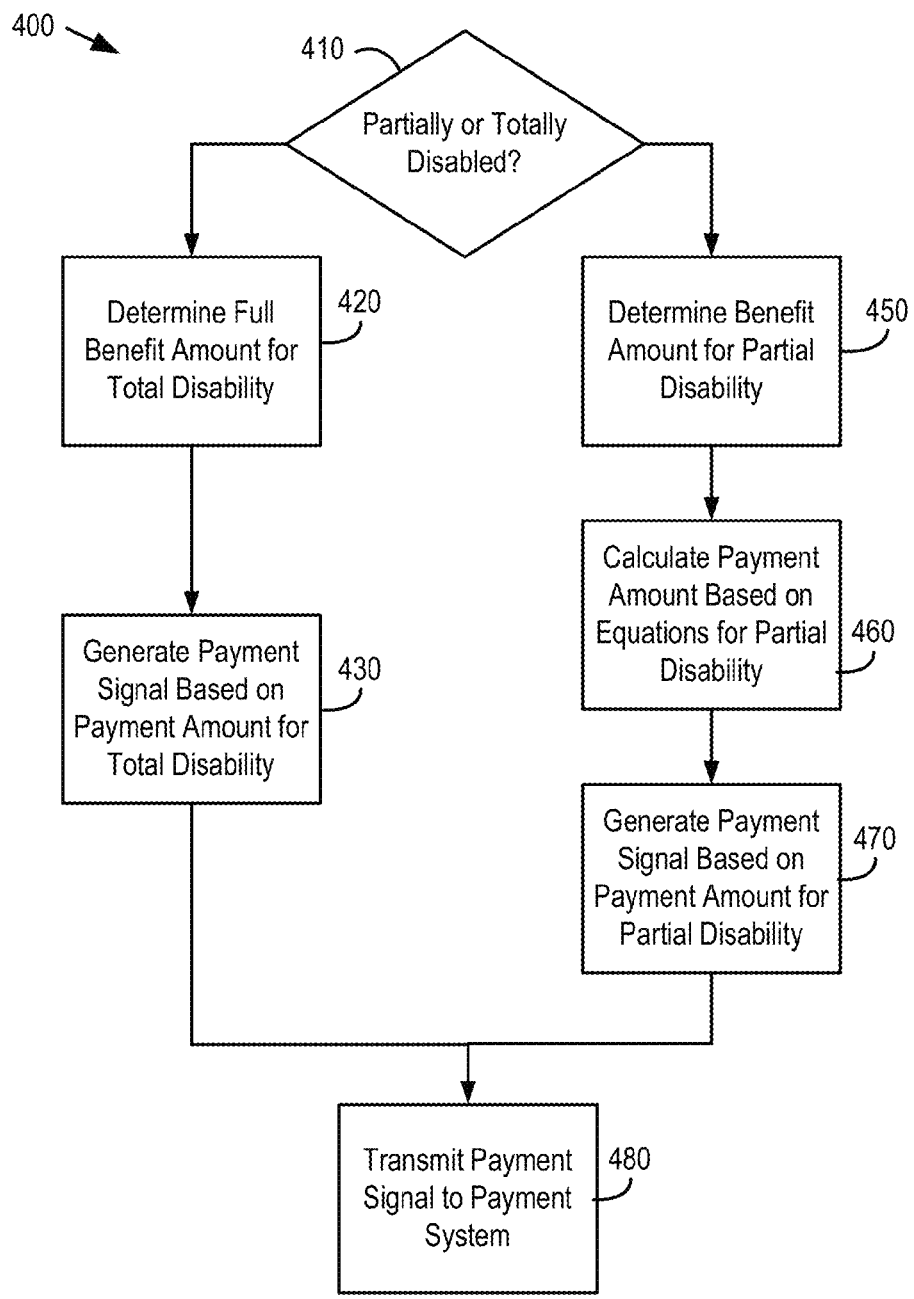
FIG. 4 is a flow chart showing operation of the computer system of FIG. 1 in connection with making a payment according to an example embodiment.

Referring now to FIG. 4, FIG. 4 is a flow chart showing operation of the computer system of FIG. 1 in connection with making a payment to an insured or other policyowner when it is determined that the insured is totally or partially disabled according to an example embodiment. At step 410, it is determined whether the insured is partially or totally disabled. This determination may be made by accessing the information stored in the data storage system 140 as a result of the determination made in FIG. 2 or FIG. 3 (i.e., the previously-made determination whether the insured is totally disabled or partially disabled). If the insured is totally disabled, then the full benefit amount is determined at step 420 (e.g., by retrieving it from data storage system 140) and a payment signal is generated based on the benefit amount for the full disability at step 430. If the insured is partially disabled, then the full benefit amount is determined at step 450 and used to calculated a payment amount based on payment equations for partial disability at step 460. A payment signal is then generated based on the benefit amount for the partial disability at step 470. In both scenarios, a payment signal is then transmitted to a payment system at step 480. For example, the claims management system 120 may send a payment signal to the payment system 130 to cause a check to be printed and mailed to the policyowner, to cause funds transfer instructions to be sent to an ACH system or other electronic payment network to transfer funds to an account of the payee, or to implement payment in another manner. Other specifics of the payment (e.g., name and address of the insured, account numbers, etc.) may be retrieved from the data storage system 140. As will be appreciated, such payments may be sent to the payee on a monthly basis.

Figure 5:
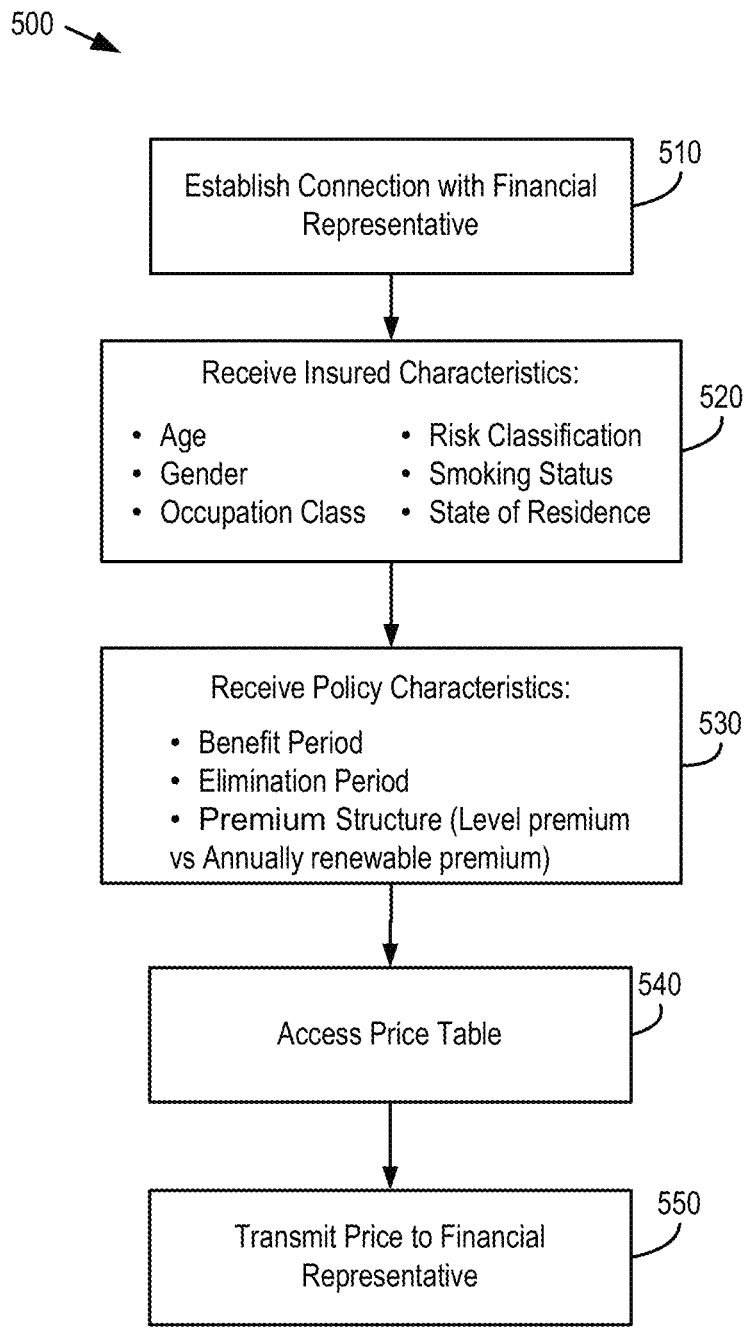
FIG. 5 is a flow chart showing operation of the computer system of FIG. 1 in connection with underwriting and pricing a policy according to an example embodiment.
Figure 6:
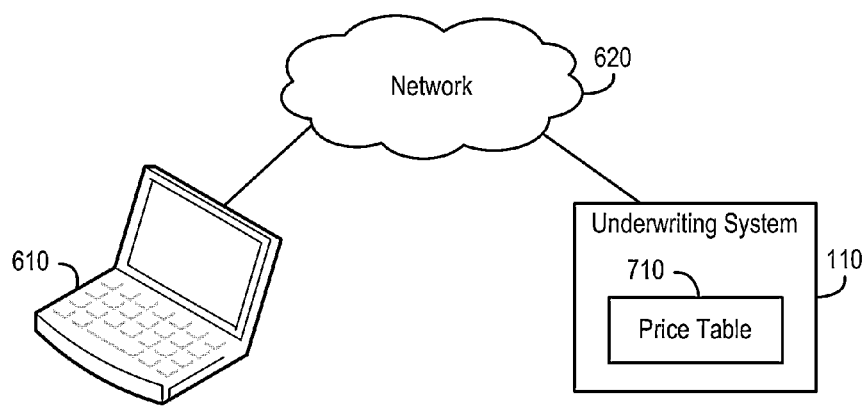
FIG. 6 shows the system of FIG. 1 being accessed by a computer system of a financial representative according to an example embodiment.
Figure 7:
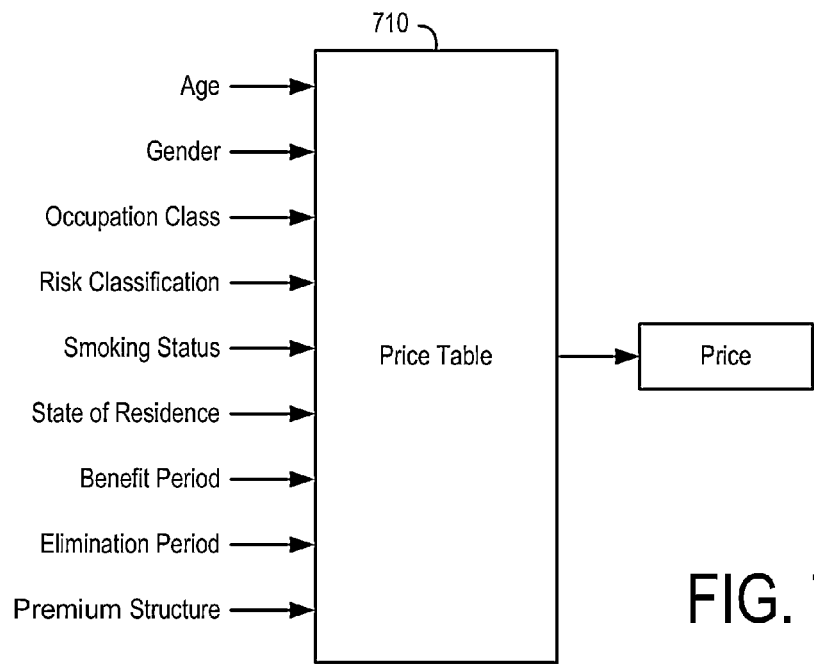
FIG. 7 is a diagram showing a price table used to generate a price for a disability policy according to an example embodiment.

Referring now to FIGS. 5-7, operation of the underwriting system 110 in connection with underwriting, pricing, and issuance of disability policies is shown in greater detail. Referring first to FIG. 5, FIG. 5 is a flow chart showing operation of the computer system 100 of FIG. 1 in connection with underwriting and pricing a policy (i.e., prior to the occurrence of any disability). At step 510, a network connection is established with a financial representative. For example, the financial representative may be a representative of a company that offers disability income insurance policies for sale to the public. The company may, for example, provide a pricing service via a secure website that may be accessed by its financial representatives. With reference to FIG. 6, the financial representative may then use a computer 610 to access the pricing service through network 620 (e.g. via the Internet) in order to obtain pricing information for a policy that may be sold to a prospective client/customer.

Thus, at steps 520 and 530, characteristics of the insured and characteristics of the policy are received, respectively. For example, in speaking with the client/customer, the financial representative may obtain various information about the proposed insured (e.g., age, gender, occupation, state of residence, smoking status, other information that may be used to classify risk, etc.) and various information about the disability policy the client/customer wishes to obtain (e.g., elimination period, benefit period, premium structure, etc.). This information may then be entered by the financial representative into the computer system 610 and transmitted by the computer system 610 to the secure web site provided by the computer system 100 where it is stored in the data storage system 140.

At step 540, and as shown in FIG. 7, the underwriting system uses the information received from the financial representative to access a price table 710. Price table 710 may, for example, be a lookup table which takes as inputs the information about the proposed insured and the policy that is sought to be obtained. The price table 710 comprises numerous fields each of which corresponds to a particular combination of ranges of values. Each possible combination of input values has a corresponding price entry in the pricing table 710. Hence, when the information is received from the financial representative, the underwriting system 110 uses this information as input data to the pricing table 710 to transform this information into a price for the disability income insurance policy (step 540). The price may then be transmitted to the financial representative and displayed to the financial representative using the computer system 610. After the policy is issued, a premium payment may then be received (e.g., from the policyowner, from the insured's employer, etc.) in accordance with the price determined at step 540.

The price table 710 may be generated using information about past claims under disability income insurance policies. That is, information about past claims may be transformed into price table 710 by performing modeling on the pertinent information for the past policies (e.g., age, gender, occupation, state of residence, smoking status) to reflect the probability of incurring a claim upon which benefits are paid. The results of such modeling are then used to populate each of the fields of the pricing table 710. As will be appreciated, the primary impact of determining a benefit level to be provided to a policyowner in the manner described above may be in terms of benefit cost rather than in terms of the probability of the policyowner being entitled to a benefit. That is, the total number of claims in which the policyowner is entitled to a disability benefit may remain unchanged. However, once the policyowner is entitled to the benefit, the cost of providing the benefit may increase, since the number of instances where the full benefit level is given (as opposed to a partial benefit for a partial disability) may increase. The price table 710 may be configured in a manner which reflects the higher benefit cost associated with considering the insured to be totally disabled even though the insured is able to perform some of the duties that were regular duties of the insured's occupation prior to the disability. For example, the price table 710 may be configured to return prices which are higher in order to reflect the higher benefit cost.

The embodiments of the present invention have been described with reference to drawings. The drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media may be any available media that may be accessed by a general purpose or special purpose computer or other machine with a processor. By way of example, such machine-readable media may comprise RAM, ROM, EPROM, EEPROM, CD-ROM or other optical disk storage, magnetic disk storage or other magnetic storage devices, or any other medium which may be used to carry or store desired program code in the form of machine-executable instructions or data structures and which may be accessed by a general purpose or special purpose computer or other machine with a processor. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present invention may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, mini-computers, mainframe computers, and so on. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include one or more general purpose computers including a processing unit, a system memory or database, and a system bus that couples various system components including the system memory to the processing unit. The database or system memory may include read only memory (ROM) and random access memory (RAM). The database may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. User interfaces, as described herein may include a computer with monitor, keyboard, a keypad, a mouse, joystick or other input devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present invention. Such variations will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the design, operating conditions and arrangement of the embodiments without departing from the scope of the present invention.

Throughout the specification, numerous advantages of the exemplary embodiments have been identified. It will be understood of course that it is possible to employ the teachings herein without necessarily achieving the same advantages. Additionally, although many features have been described in the context of a particular data processing unit, it will be appreciated that such features could also be implemented in the context of other hardware configurations.

While the exemplary embodiments illustrated in the figures and described above are presently preferred, it should be understood that these embodiments are offered by way of example only. Other embodiments may include, for example, structures with different data mapping or different data. The invention is not limited to a particular embodiment, but extends to various modifications, combinations, and permutations that nevertheless fall within the scope and spirit of the appended claims.

What is claimed is:

1. A method of processing an insurance claim under a disability income insurance policy, the disability income insurance policy being configured for an insured having an occupation in which the insured performs a first set of duties and other duties, the insurance claim arising out of a disability of the insured, the method comprising:

storing, by a computer system comprising a computer processor and a memory coupled to the computer processor, information regarding activities of the insured, the activities of the insured being in connection with the occupation of the insured during a time period preceding the disability;

analyzing, by the computer system, the information regarding the activities of the insured to determine an extent to which the insured engaged in the first set of duties, wherein the first set of duties are set forth in the disability income insurance policy, the analyzing including:

calculating an amount of the activities of the insured attributable to the first set of duties; and calculating a total amount of activities of the insured in connection with the occupation;

determining, by the computer system, a relative amount of activities of the insured attributable to the first set of duties prior to the disability based on the analysis;

receiving, by the computer system, claim information regarding an insurance claim for the insured, wherein the claim information comprises information regarding a condition of the insured after the disability;

applying, by the computer system, a threshold test to the insurance claim, wherein applying the threshold test comprises:

retrieving a predetermined threshold amount of activities, wherein the predetermined threshold amount is set forth in the disability income insurance policy and represents a portion of the total amount of activities attributable to the first set of duties; and generating a comparison of the relative amount of activities of the insured attributable to the first set of duties prior to the disability with the threshold amount, wherein the threshold test is configured to ensure that the insured spent at least the threshold amount of activities engaging in the first set of duties, wherein the threshold amount is set such that the threshold test may be met even if less than all of the activities of the insured are spent engaging in the first set of duties;

determining, by the computer system, a benefit payment amount to be provided based on results of the threshold test and based on whether the insured is unable to perform the first set of duties;

generating, by the computer system, a payment signal based on the benefit payment amount determination; and sending, by the computer system, the payment signal to a payment system to cause the benefit payment amount to be paid.

2. A method according to claim 1, wherein the benefit payment amount is based on a categorization of the disability of the insured, and wherein the disability is categorized as either a total disability or a partial disability based on results of the threshold test and based on whether the insured is unable to perform the first set of duties.

3. A method according to claim 1, wherein storing the information regarding the activities comprises storing billing information for services performed by the insured; and wherein the analyzing step comprises analyzing the billing information during the time period preceding the disability to determine the extent to which the insured engaged in the first set of duties.

4. A method according to claim 3, wherein the billing information is represented as charges;

wherein calculating the amount of the activities of the insured attributable to the first set of duties comprises calculating a portion of charges of the insured attributable to the first set of duties;

wherein calculating the total amount of activities of the insured in connection with the occupation comprises calculating a total amount of charges of the insured;

wherein determining the relative amount of activities attributable to the first set of duties comprises calculating a ratio of the portion of charges attributable to the first set of duties to the total amount of charges;

wherein generating the comparison comprises generating a comparison of comparing the ratio with the predetermined threshold amount.

5. A method according to claim 4, wherein the predetermined threshold amount is fifty percent.

6. A method according to claim 1, wherein the benefit payment amount is further based on whether the insured is gainfully employed.

7. A method according to claim 1, wherein the benefit payment amount is based on a categorization of the disability of the insured, and wherein the categorization does not take into account whether the insured is able to earn income by performing the other duties.

8. A method according to claim 1, wherein the benefit payment amount is not based on whether the insured is able to perform the other duties, even if the other duties were among duties of the insured in connection with the occupation of the insured during the time period preceding the disability.

9. A method according to claim 1, further comprising retrieving the information regarding the condition and the information regarding the activities from a data storage system.

10. A method according to claim 1, wherein the condition is a physical condition.

11. A method according to claim 1, wherein the condition is a mental condition.

12. A method according to claim 1, wherein the activities include physical activities.

13. A method according to claim 1, wherein the first set of duties are a subset of a second set of duties, wherein the threshold test is a first threshold test, and wherein the method further comprises applying a second threshold test to compare an amount of the activities of the insured attributable to the second set of duties with a second predetermined threshold amount.

14. A method according to claim 1, wherein the first set of duties are duties of a medical specialty, and wherein the method further comprises determining whether board certification is available for the medical specialty.

15. A method according to claim 1, wherein the time period is predetermined and is between six and eighteen months in length.

16. A method according to claim 1, wherein the time period is the twelve month period extending from twelve months prior to when the disability began to when the disability began.

17. A method according to claim 1, further comprising displaying the information regarding the condition of the insured to a claims processor.

18. A computer-implemented data processing system comprising a processor and computer-readable media having stored therein a set of instructions that when executed cause the processor to implement a method of processing an insurance claim of an insured under a disability income insurance policy, the disability income insurance policy being configured for an insured having an occupation in which the insured performs a first set of duties and other duties, the insurance claim arising out of a disability of the insured, wherein the method comprises the steps of:

storing information regarding activities of the insured in the data storage system, the information regarding the activities of the insured being in connection with the occupation of the insured during a time period preceding the disability;

analyzing, by the computer system, the information regarding the activities of the insured to determine an extent to which the insured engaged in the first set of duties, wherein the first set of duties are set forth in the disability income insurance policy, the analyzing including:
calculating an amount of the activities of the insured attributable to the first set of duties; and
calculating a total amount of activities of the insured in connection with the occupation;

determining, by the computer system, a relative amount of activities of the insured attributable to the first set of duties prior to the disability based on the analysis;

receiving, by the computer system, claim information regarding an insurance claim for the insured, wherein the claim information comprises information regarding a condition of the insured after the disability;

applying, by the computer system, a threshold test to the insurance claim, wherein applying the threshold test comprises:
retrieving a predetermined threshold amount of activities, wherein the predetermined threshold amount is set forth in the disability income insurance policy and represents a portion of the total amount of activities attributable to the first set of duties; and
generating a comparison of the relative amount of activities of the insured attributable to the first set of duties prior to the disability with the threshold amount, wherein the threshold test is configured to ensure that the insured spent at least the threshold amount of activities engaging in the first set of duties, wherein the threshold amount is set such that the threshold test may be met even if less than all of the activities of the insured are spent engaging in the first set of duties;

determining an amount of a benefit payment to be provided based on results of the threshold test and based on whether the insured is unable to perform the first set of duties;

generating a payment signal based on the benefit payment amount determination; and sending the payment signal to a payment system to cause the benefit payment to be made.

19. A system according to claim 18, wherein the determining of the amount of the benefit payment does not take into account whether the insured is able to perform the other duties, even if the other duties were among duties of the insured in connection with the occupation of the insured during the time period preceding the disability.

20. A system according to claim 18, wherein determining the amount of the benefit payment comprises categorizing the disability of the insured, and wherein the disability is categorized as either a total disability or a partial disability based on results of the threshold test and based on whether the insured is unable to perform the first set of duties.

21. A system according to claim 18, wherein storing information regarding activities comprises storing billing information for services performed by the insured in the data storage system, and wherein the analyzing comprises analyzing the billing information during the time period preceding the disability to determine the extent to which the insured engaged in the first set of duties.

22. A system according to claim 21,
wherein the billing information is represented as charges;
wherein calculating the amount of the activities of the insured attributable to the first set of duties comprises calculating a portion of charges of the insured attributable to the first set of duties;
wherein calculating the total amount of activities of the insured in connection with the occupation comprises calculating a total amount of charges of the insured;
wherein determining the relative amount of activities attributable to the first set of duties comprises calculating a ratio of the portion of charges attributable to the first set of duties to the total amount of charges;
wherein generating the comparison comprises generating a comparison of the ratio with the predetermined threshold amount.

23. A system according to claim 22, wherein the predetermined threshold amount is fifty percent.

24. A system according to claim 18, wherein the benefit payment amount is further determined based on whether the insured is gainfully employed.

25. A system according to claim 18, wherein determining the amount of benefit payment comprises categorizing the disability of the insured, and wherein the categorizing does not take into account whether the insured is able to earn income by performing the other duties.

26. A system according to claim 18, further comprising retrieving the information regarding the condition and the information regarding the activities from the data storage system.

27. A system according to claim 18, wherein the condition is a physical condition.

28. A system according to claim 18, wherein the condition is a mental condition.

29. A system according to claim 18, wherein the activities include physical activities.

30. A system according to claim 18, wherein the first set of duties are a subset of a second set of duties, wherein the threshold test is a first threshold test, and wherein the method further comprises applying a second threshold test to compare an amount of the activities of the insured attributable to the second set of duties with a second predetermined threshold amount.

31. A system according to claim 18, wherein the first set of duties are duties of a medical specialty, and wherein the method further comprises determining whether board certification is available for the medical specialty.

32. A system according to claim 18, wherein the time period is predetermined and is between six and eighteen months in length.

33. A system according to claim 18, wherein the time period is the twelve month period extending from twelve months prior to when the disability began to when the disability began.

34. A system according to claim 18, further comprising displaying the information regarding the condition of the insured to a claims processor.

* * * * *